(12) United States Patent
Remo

(10) Patent No.: US 11,992,147 B2
(45) Date of Patent: May 28, 2024

(54) MACHINE AND METHOD FOR PRODUCING BEVERAGES BY MEANS OF SINGLE SERVING CAPSULES

(71) Applicant: ASCENDO MEDIENAGENTUR AG, Vaduz (LI)

(72) Inventor: Gianni Remo, Lugano (CH)

(73) Assignee: ASCENDO MEDIENAGENTUR AG, Vaduz (LI)

(*) Notice: Subject to any disclaimer, the term of this patent is extended or adjusted under 35 U.S.C. 154(b) by 42 days.

(21) Appl. No.: 16/969,780

(22) PCT Filed: Feb. 8, 2019

(86) PCT No.: PCT/IB2019/051029
§ 371 (c)(1),
(2) Date: Aug. 13, 2020

(87) PCT Pub. No.: WO2019/159047
PCT Pub. Date: Aug. 22, 2019

(65) Prior Publication Data
US 2020/0405090 A1    Dec. 31, 2020

(30) Foreign Application Priority Data
Feb. 16, 2018    (IT) .................. 102018000002769

(51) Int. Cl.
*A47J 31/36*    (2006.01)
*B65D 85/804*    (2006.01)

(52) U.S. Cl.
CPC ...... *A47J 31/3623* (2013.01); *B65D 85/8043* (2013.01)

(58) Field of Classification Search
CPC ......................................... B65D 85/804–8067
See application file for complete search history.

(56) References Cited

U.S. PATENT DOCUMENTS

| | | | |
|---|---|---|---|
| 2010/0178392 A1* | 7/2010 | Yoakim | A47J 31/0642 99/302 C |
| 2010/0239734 A1* | 9/2010 | Yoakim | A47J 31/22 99/302 C |
| 2012/0231126 A1* | 9/2012 | Lo Faro | A47J 31/407 426/115 |
| 2013/0129872 A1* | 5/2013 | Kruger | A47J 31/407 426/115 |
| 2013/0183130 A1 | 7/2013 | Etter et al. | |
| 2014/0007776 A1 | 1/2014 | Mori et al. | |
| 2015/0017288 A1* | 1/2015 | Lo Faro | B65D 85/8043 426/112 |

(Continued)

FOREIGN PATENT DOCUMENTS

| | | |
|---|---|---|
| CN | 101061926 A | 10/2007 |
| CN | 101677707 A | 3/2010 |

(Continued)

*Primary Examiner* — Drew E Becker
*Assistant Examiner* — Chaim A Smith
(74) *Attorney, Agent, or Firm* — McGlew and Tuttle, P.C.

(57) ABSTRACT

The machine (10) comprises a brewing chamber (23) adapted to receive a capsule (1) and a duct (33) for supplying water to the brewing chamber (23), as well as a duct (51) for dispensing beverage from the brewing chamber (23). The machine (10) further comprises a rotation device (3) adapted to rotate the capsule (10).

13 Claims, 7 Drawing Sheets

(56) References Cited

U.S. PATENT DOCUMENTS

2015/0289707 A1    10/2015  Kaeser et al.
2016/0374502 A1*   12/2016  Phan .................... A23F 5/26
                                                    426/232
2017/0196397 A1     7/2017  Flick et al.
2017/0305654 A1    10/2017  Krueger

FOREIGN PATENT DOCUMENTS

| CN | 106132254 A   | 11/2016 |
| CN | 106955023 A   |  7/2017 |
| EP |   2119383 A1  | 11/2009 |
| WO | 2015173124 A1 | 11/2015 |

* cited by examiner

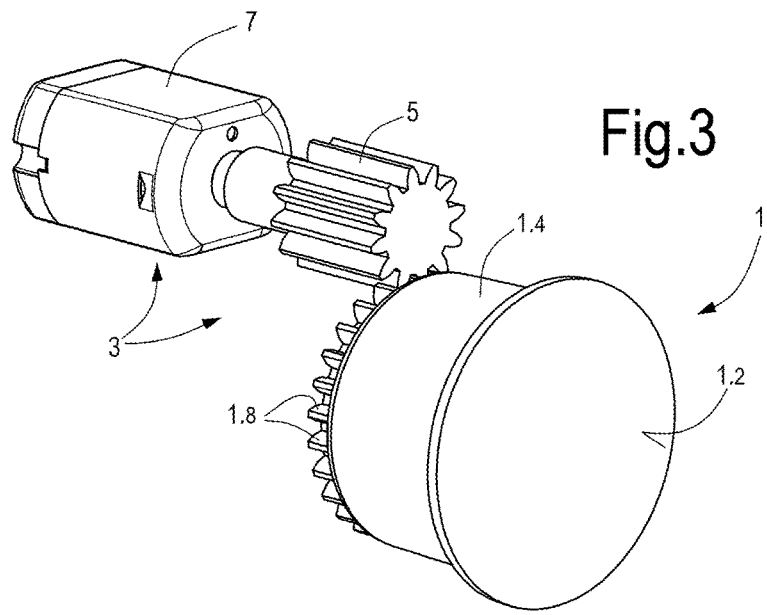
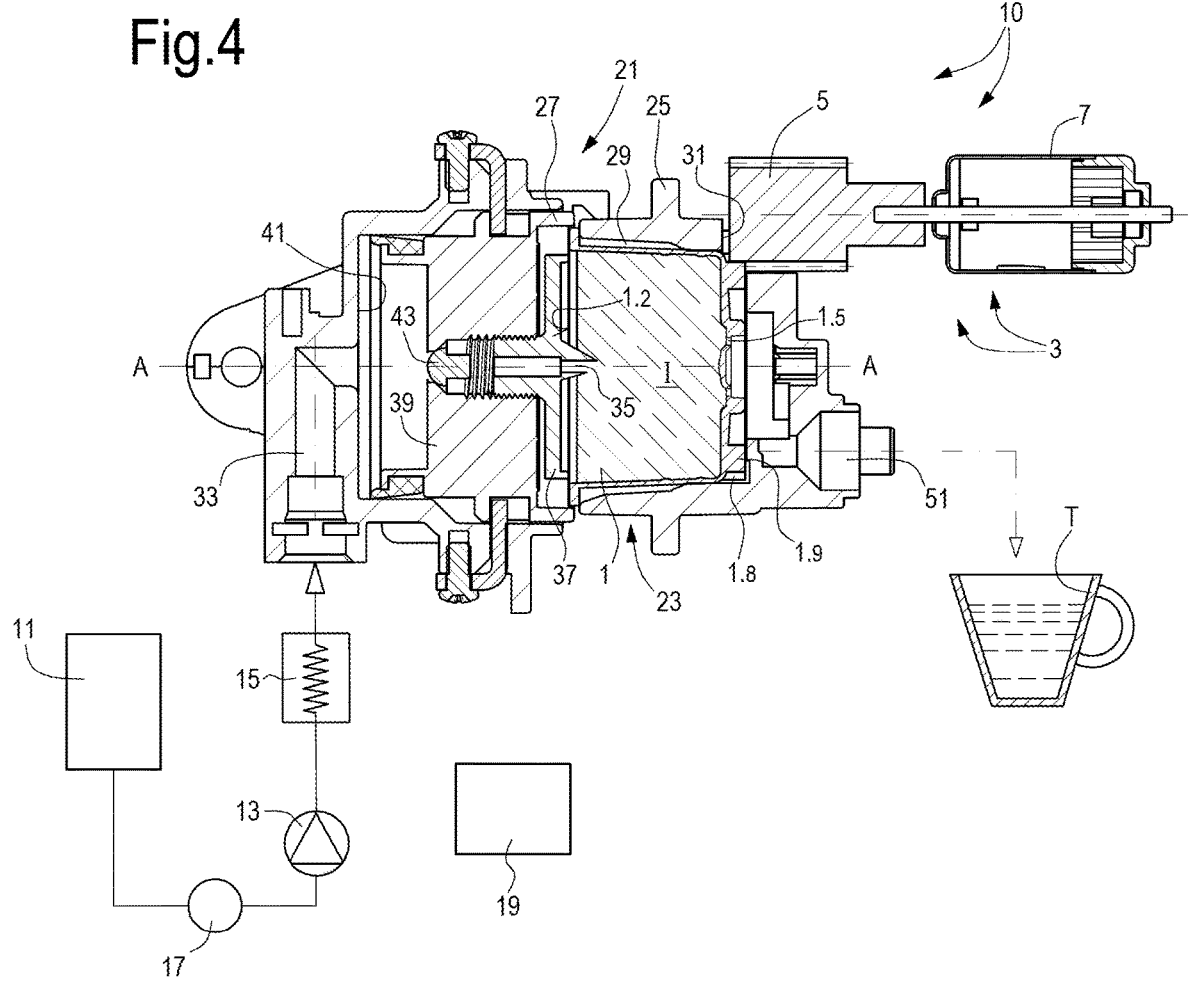

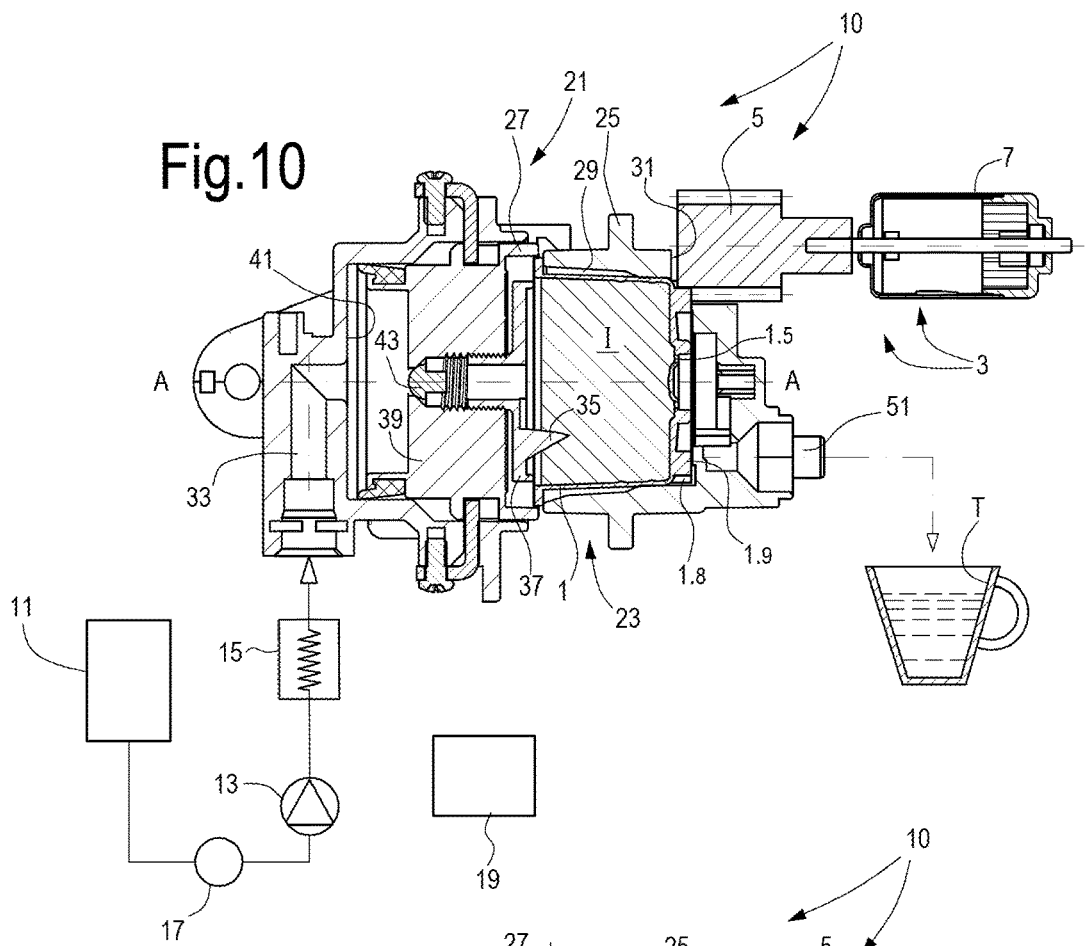
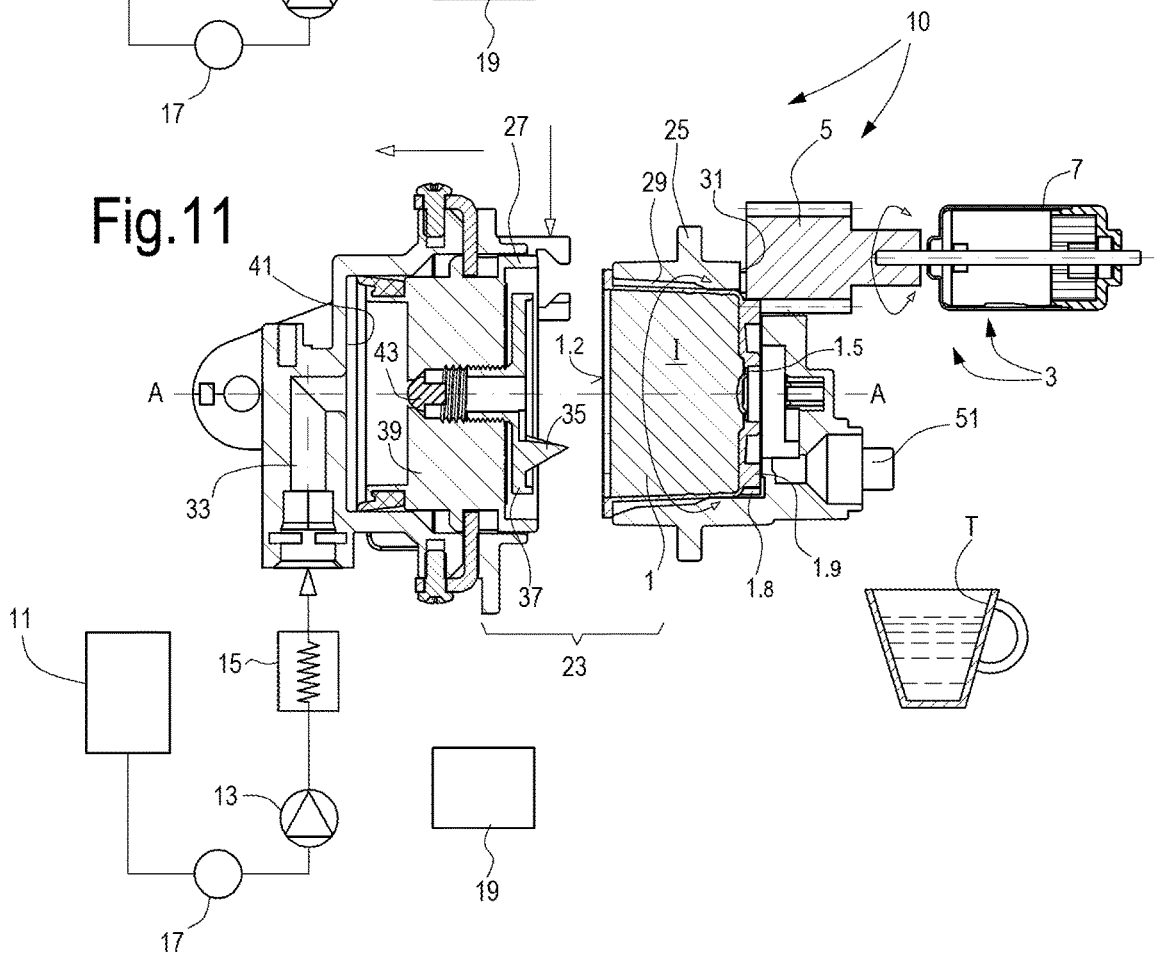

MACHINE AND METHOD FOR PRODUCING BEVERAGES BY MEANS OF SINGLE SERVING CAPSULES

TECHNICAL FIELD

Machines, methods and capsules for producing beverages are described below.

STATE OF THE ART

For producing beverages, in particular hot beverages, such as coffee or the like, machines that utilize single serving capsules are often used. The capsules contain a given amount of ingredients, through which the beverage is produced by dispensing water through the capsule. The water, which can be hot and can be pressurized, interacts with the ingredients dissolving or extracting the components thereof, which are dissolved or dispersed in the water.

Several machines for producing beverages from ingredients contained in single-serving and disposable capsules are known. These machines usually comprise a brewing chamber into which the capsule is inserted. The brewing chamber is associated with a duct to supply water, which can be pre-heated and pressurized. The pressure and the temperature of the water can vary, for example, as a function of the type of beverage to be produced, the ingredients used and the quality of beverage to be obtained.

The brewing chamber is also associated with a beverage dispensing duct, which collects the beverage delivered from the capsule.

The brewing chamber can also be associated with perforators to perforate one or two opposite walls in order to create a water inlet or a beverage outlet, or both a water inlet and a beverage outlet.

The position of the capsule in the brewing chamber can vary as a function of the architecture of the beverage producing machine. In some machines the brewing chamber is configured so that the capsule is arranged vertically. In other machines the capsule is arranged horizontally. In the first case, the flow of water and of beverage produced is from top to bottom. In the second case, the flow of water and beverage produced is approximately horizontal. Intermediate configurations, where the capsule is arranged inclined and the flow of water and beverage is inclined with respect to the horizontal, also exist.

Brewing chambers with horizontal arrangement of the capsule and approximately horizontal flow of the water and of the beverage are particularly widespread, as they have considerable advantages from the point of view of construction and use.

However, above all when a flow of water that is approximately horizontal, or in any case non-vertical, passes through the capsule, utilization of the amount of ingredients inside the capsule is not optimal. In fact, due to the effect of gravity, the water tends to flow unevenly toward the inside of the capsule. Most of the water passes through the bottommost area of the capsule. This causes problems in terms of quality of the beverage obtained.

Therefore, there is the need to improve the flow of water through single serving capsules.

SUMMARY OF THE INVENTION

According to a first aspect, a machine for producing beverages by means of single serving capsules is described, comprising: a brewing chamber adapted to receive a capsule; a duct for supplying water to the brewing chamber; a duct for dispensing beverage from the brewing chamber. Characteristically, the machine also comprises a rotation device, adapted to rotate the capsule with respect to the water supply duct. In this way, optimal use of the ingredients contained inside the capsule is obtained, also and above all when the beverage preparation cycle takes place with the beverage held in horizontal position, or in any case inclined with respect to the vertical, i.e., when the flow of liquid (water and beverage) passes through the capsule in a horizontal, or in any case non-vertical, direction.

The rotation device can comprise a rotating actuator and means for transmitting a rotation motion from the rotating actuator to the capsule. For example, the actuator can be an electric motor. However, it would also be possible to use actuators of different type, for example a hydraulic motor.

The capsule can be configured so as to rotate inside the brewing chamber. For this purpose, the capsule can, for example, have a coupling profile, to receive the motion from the rotation device. In some embodiments, coupling can be obtained with a toothing on the capsule, which meshes with a gear wheel of the rotation device In some embodiments, the brewing chamber comprises a portion forming a seat for housing the capsule and having a lateral wall for containing the capsule. The lateral wall can have an opening, through which a toothed wheel of the rotation device enters the housing seat to co-act with the capsule contained in the brewing chamber.

In other embodiments, the rotation device is adapted to rotate at least a rotating portion of the brewing chamber, in which the capsule can be housed. In this case, the capsule and the portion of the brewing chamber rotate integrally. The rotating portion of the brewing chamber can have an outer toothing, co-acting with a toothed wheel of the rotation device.

To obtain more reliable operation, in this case the capsule can have a profile, for example a toothing, which couples torsionally with a corresponding profile of the brewing chamber, so that the capsule rotates integrally with the rotating portion of the brewing chamber.

In other embodiments the capsule can have a non-circular cross section, so as to couple torsionally with a portion, also with a non-circular cross section, of the rotating portion of the brewing chamber.

In some embodiments, the duct for supplying water to the brewing chamber, and more in particular the end portion thereof, is arranged in a position substantially coaxial with respect to the brewing chamber.

For example, the brewing chamber can comprise a perforator, which forms the end part of the duct for supplying water to the brewing chamber. The perforator can then be positioned approximately coaxial to the brewing chamber and to the capsule so that the capsule can rotate about the axis thereof (alone or integrally with brewing chamber), without being lacerated by the perforator. In this way it is possible to rotate the capsule while the brewing chamber is dispensing beverage.

In other embodiments, supply of water and dispensing of the beverage can be interrupted in the intervals of time in which the capsule rotates. In this case, it can also be foreseen to open the brewing chamber to rotate the capsule (alone or together with a portion of the brewing chamber). By opening the brewing chamber the perforator can be moved away from the capsule. Opening of the brewing chamber to carry out rotation of the capsule can advantageously take place when the perforator, or the end part of the water supply duct, is not coaxial to the capsule.

While in some embodiments the capsule and the brewing assembly can be configured to rotate the capsule in the brewing chamber, as indicated above, in other embodiments the capsule can rotate with the portion of brewing chamber that houses it.

Embodiments in which the brewing chamber has a moving portion, to open and close the brewing chamber, and a rotating portion to rotate about the axis of the capsule will be described hereunder. In other embodiments a portion of the brewing chamber can be stationary with respect to the load bearing structure of the machine, while the other portion of the brewing chamber is provided with all the movements necessary for operation, including rotation about the axis of the capsule, which is housed in the moving portion of the brewing chamber.

Nonetheless, it would also be possible to produce a brewing chamber with two portions moving with respect to each other to open and close the brewing chamber, allowing insertion of the capsule and discharge of the used capsule, and which are at the same time configured so as to rotate integral with one and other about the axis of the capsule.

According to a further aspect, a method for producing a beverage by means of a single serving capsule is described, comprising the following steps:

dispensing a first amount of water through the capsule in a first angular position of the capsule;

dispensing a second amount of water through the capsule in a second angular position of the capsule.

The first amount of water and the second amount of water can be fed through the capsule in succession without interruption, or in distinct and separate steps of a same brewing cycle. The rotation to pass from the first angular position to the second angular position can be a continuous rotation, or a stepped rotation, for example comprising a single rotation step of 180°. For example, the method can provide for the simultaneous operations of supplying water and rotating the capsule (alone or integrally with the brewing chamber or part thereof). In other embodiments, the brewing cycle can have distinct and sequential steps of: supplying water; rotation, supplying more water. If necessary, the steps can be repeated several times.

According to a further aspect, there is provided a capsule for producing beverages, having an axisymmetric shape and comprising an upper surface, a lower surface and a lateral surface, characterized by a circular toothing, extending around the axis of the capsule, adapted to coact with a motion transmission member.

Further advantageous characteristics and embodiments of the machine, of the method and of the capsule are described hereunder and in the appended claims, which form an integral part of the present description.

BRIEF DESCRIPTION OF THE DRAWINGS

The invention will be better understood by following the description and accompanying drawings, which show a non-limiting example of embodiment of the invention. More specifically, in the drawing:

FIG. 3 illustrates an axonometric view of the capsule and of the rotation device of FIGS. 1 and 2;

FIG. 4 illustrates a longitudinal section of a machine with a brewing chamber, provided with a rotation device of the capsule inserted in the brewing chamber according to the embodiment of FIGS. 1 to 3;

FIGS. 10 and 11 illustrate different steps of a brewing cycle via a brewing assembly in a further embodiment;

DETAILED DESCRIPTION OF AN EMBODIMENT

The following detailed description of embodiments given by way of example refers to the accompanying drawings. The same reference numbers in different drawings identify identical or similar elements. Moreover, the drawings are not necessarily to scale. The following detailed description does not limit the invention. Rather, the scope of the invention is defined by the accompanying claims.

Reference in the description to "an embodiment" or "the embodiment" or "some embodiments" means that a particular feature, structure or element described in relation to an embodiment is included in at least one embodiment of the object described. Therefore, the phrase "in an embodiment" or "in the embodiment" or "in some embodiments" used in the description does not necessarily refer to the same embodiment or embodiments. Furthermore, the particular features, structures or elements may be combined in any appropriate manner in one or more embodiments.

Hereunder, specific reference will be made to machines and capsules for producing coffee, but it must be understood that what is described and illustrated can also be implemented using capsules containing different ingredients, for the production of other types of beverages.

A first embodiment is illustrated in FIGS. 1 to 5. In this embodiment a capsule is provided with members adapted to couple directly with a rotation device that causes rotation of the capsule inside a brewing chamber during brewing, i.e. during the beverage preparation cycle.

Figure 1:
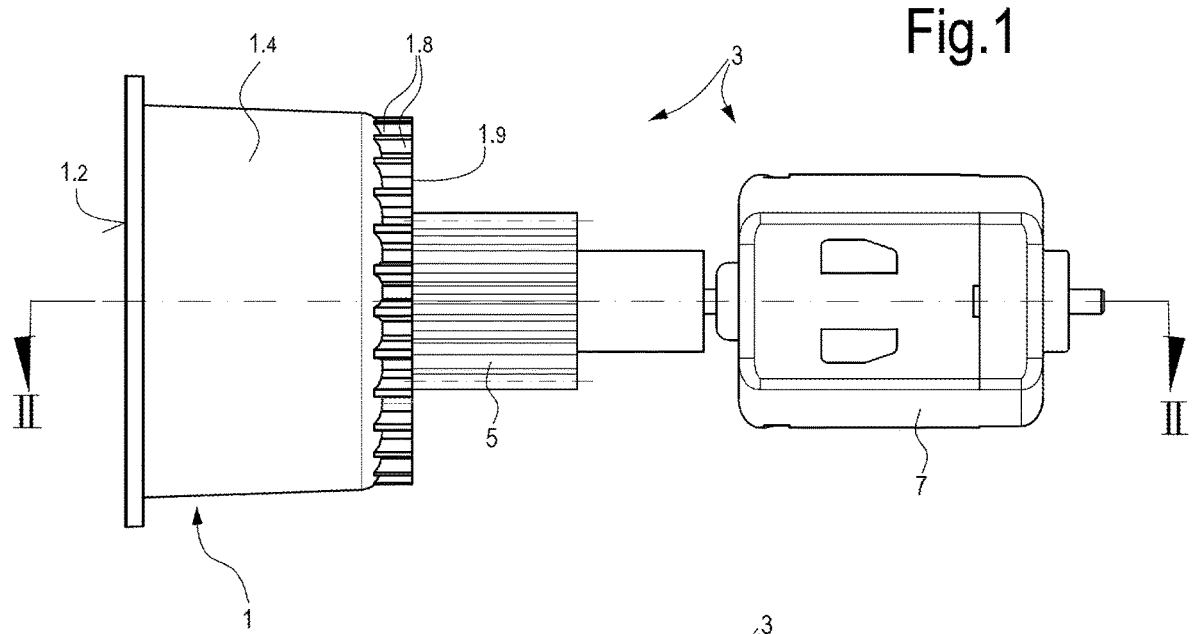
FIG. 1 illustrates, in a view along the line I-I of FIG. 2, a capsule and a rotation device in a possible embodiment.
Figure 2:
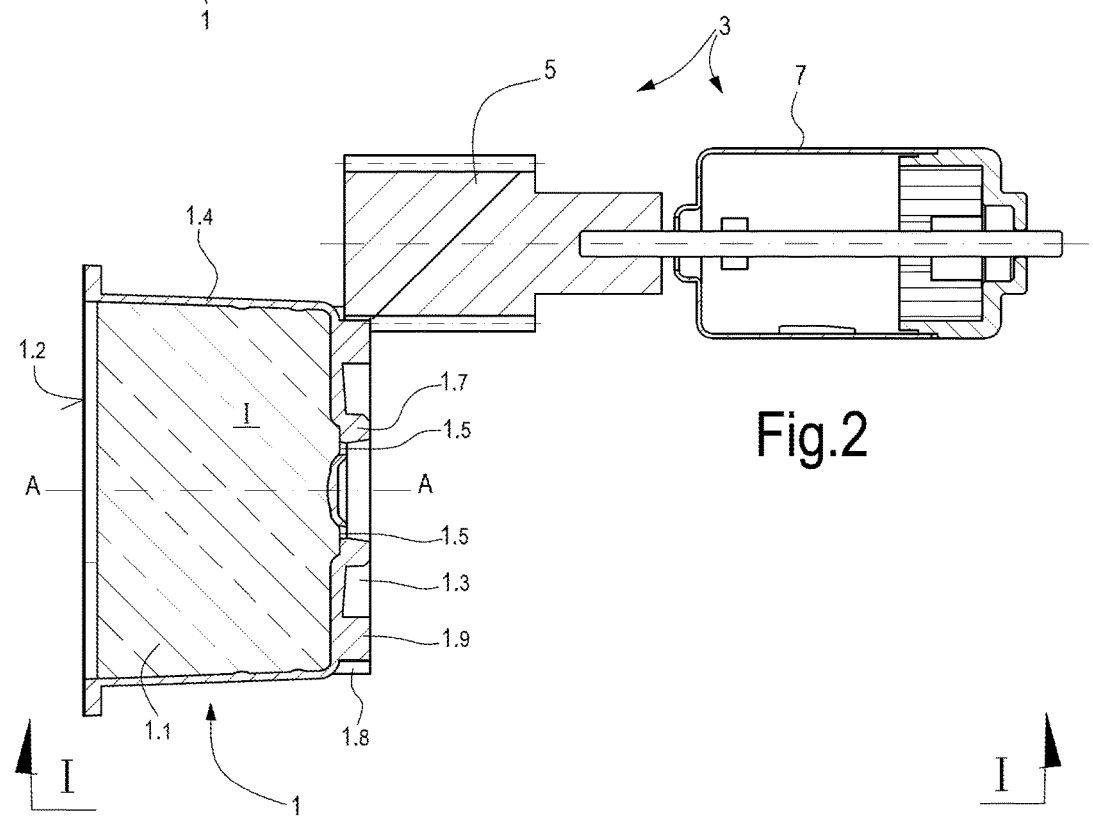
FIG. 2 illustrates a longitudinal section along the line II-II of FIG. 1.

For a better understanding of the operation of the machine, FIGS. 1, 2 and 3 only show a capsule 1 and a rotation device 3, configured to cause the capsule 1 to rotate about an axis of symmetry A-A of the capsule. In the illustrated embodiment, the capsule 1 comprises a body 1.1, a front or top wall 1.2 and a rear or bottom wall 1.3. The front face or wall 1.2 and the rear face or wall 1.3 are joined to each other by a lateral wall 1.4. As shown in particular in the axonometric view of FIG. 3, the capsule has a substantially axisymmetric shape with respect to the axis A-A. In other words, the capsule 1 is substantially defined by a solid of revolution with an axis A-A. The body of the capsule 1 can contain ground coffee or any other ingredient I for producing beverages.

The front face or wall 1.2 can be defined by a plastic film, by an aluminum foil, or by any other preferably air-tight closing element, to preserve the content I of the capsule 1 and protect it from the oxidizing action of the atmosphere. Moreover, it would also be possible to produce capsules with a pervious front surface or part 1.2, which can then be protected and stored in a sealed pack.

The rear wall or bottom 1.3 of the capsule 1 can be perforated, as shown schematically in 1.5. In some embodiments the perforations 1.5 can be closed by a removable sheet, not shown, which can be applied adhesively to a collar 1.7 that surrounds the openings 1.5. In yet other embodiments the bottom 1.3 of the capsule can be closed with a seal, without perforations.

In the illustrated embodiment, the rear wall or bottom 1.3 of the capsule 1 comprises a toothing 1.8. The toothing 1.8 can be a toothing analogous to the toothing of a toothed wheel. In other embodiments the toothing 1.8 can consist of a corrugation or of any other non-circular shape of an annular projection 1.9 on which the toothing 1.8 is formed.

The toothing 1.8 in substance forms a form-fitting coupling with a motor member 5, which can consist of a gear wheel rotated by an electric motor 7 or another actuator, forming together with the gear wheel 5 part of the rotation device 3.

As will be clarified in greater detail below, the rotation device 3 co-acts with the capsule 1 when this latter is inserted into a brewing chamber of a beverage producing machine. The rotation of the actuator 7 causes the rotation of the capsule 1 about its axis A-A while the capsule is inside the brewing chamber.

Figure 5:
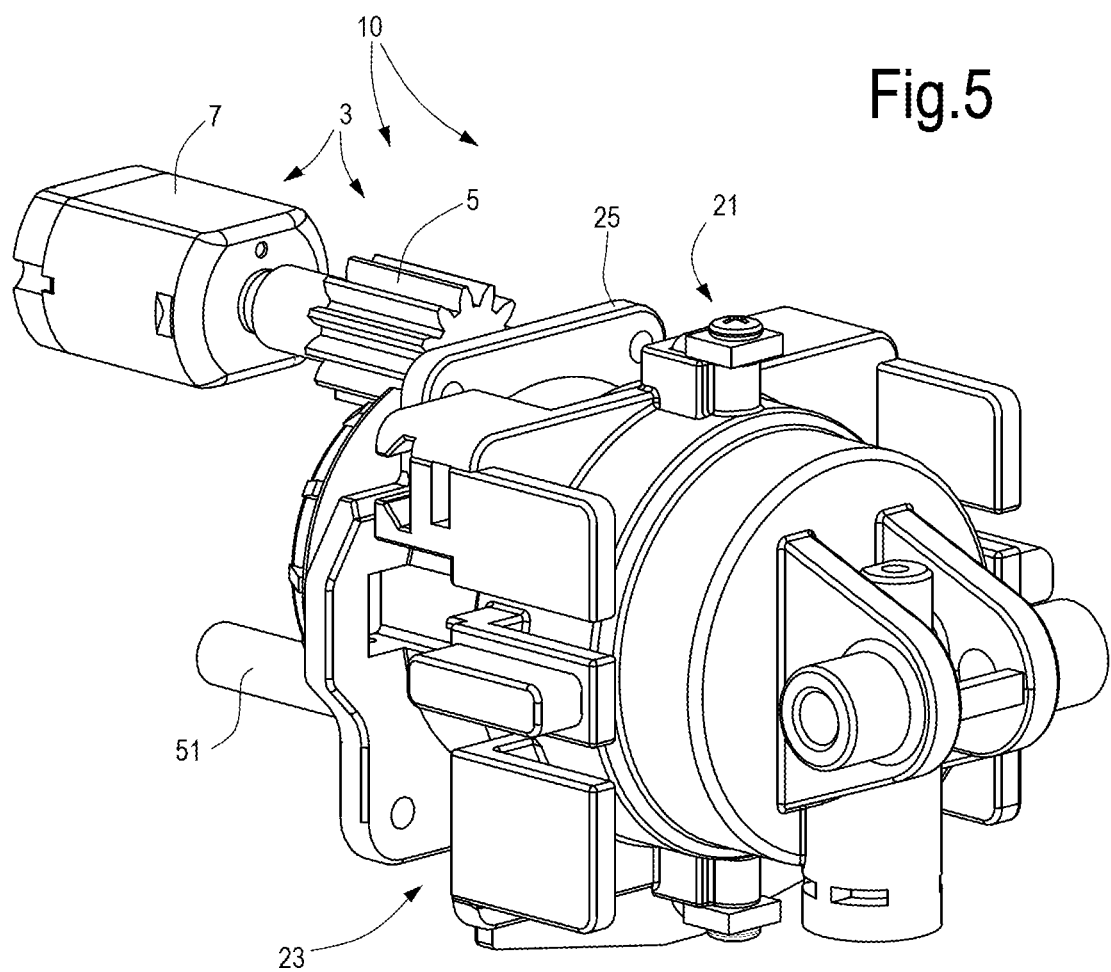
FIG. 5 illustrates an axonometric view of the machine of FIG. 4.

Greater details of a possible embodiment of the beverage producing machine in which the rotation device 3 can be inserted are illustrated in FIGS. 4 and 5. The machine, indicated as a whole with 10, is represented limited to its main components useful for understanding operation of the present invention. The machine 10 comprises a water tank 11, a pump 13, a heating assembly 15, a flow meter 17 and a control unit 19, which can be functionally connected to the other members of the machine 10.

The machine 10 further comprises the rotation device 3 and a brewing assembly 21. The brewing assembly 21 comprises in particular a brewing chamber 23. The brewing chamber can comprise a first portion 25 and a second portion 27, which can be coupled to each other to define a volume 29, inside which the capsule 1 can be inserted.

In the embodiment illustrated, the portion 25 of the brewing chamber 23 is substantially cup shaped to house the capsule 1 and has a bottom with an opening 31 at which the toothing 1.8 of a capsule 1 housed in the brewing chamber 21 is accessible to the gear wheel 5 of the rotation device 3.

The brewing chamber 23 is associated with a water supply duct 33. The supply duct 33 is in fluid communication with the inner volume 29 of the brewing chamber 23. In the embodiment illustrated, fluid communication takes place through a pervious perforator 35. The perforator 35 can be produced on a disc 37 mounted on a piston 39 sliding in a cylindrical portion 41 formed by the brewing assembly 21. The perforator can be omitted if the capsule 1 has a pervious front wall.

The arrangement is such that pressurized water supplied by the pump 13 fills a volume delimited by the cylinder 41 and by the piston 39 and pushes the latter against the front wall 1.2 of the capsule 1 housed in the brewing chamber 23 until the perforator 35 perforates the front wall 1.2 of the capsule 1, so that pressurized water supplied by the pump 13 can flow from the duct 33 into the capsule 1. In order for the pressure of the brewing water that is fed into the capsule 1 to have a value sufficient, for example, to produce espresso coffee, a valve 43, which only opens when the pressure of the water in the duct 33 and in the cylinder 41 has reached a suitable level of pressure, can be arranged on the piston 39.

The aforesaid characteristics of the brewing assembly 21 and of the brewing chamber 23 are provided purely by way of example, it being understood that the brewing assembly 21 and the brewing chamber 23 can have different configurations to the one described, provided that it is possible to rotate the capsule 1 inside the brewing chamber 23 by means of the rotation assembly 3 during a brewing cycle, as described below in greater detail.

In the illustrated embodiment, in addition to the water supply duct 33, the brewing chamber 23 is also associated with a duct 51 for dispensing the beverage, which can be collected in a container, for example a cup T, illustrated schematically in FIG. 4.

The duct 51 can have an inlet positioned in a lower part of the cup shaped portion 25 of the brewing chamber 23. In the embodiment illustrated, the rear wall 1.3 is pre-perforated and therefore the brewing chamber is not provided with a perforator on the portion 25. Nonetheless, in other embodiments the capsule 1 can have a closed bottom wall 1.3 and the brewing chamber can be provided with a perforator. The rear perforator can perforate the capsule when the brewing chamber is closed, pushing the capsule 1 with the bottom 1.3 thereof against the bottom of the cup shaped portion 25 of the brewing chamber 23.

As can be seen in FIG. 4, the brewing assembly 21 is arranged so that the capsule 1 is located with the axis A-A thereof in horizontal position when the capsule is inserted in the brewing chamber 23.

If no further measures are taken, the water dispensed through the supply duct 33 into the capsule 1 tends to accumulate in the lower part of the inner volume of the capsule 1 so that the part of ingredients I located in the upper half of the capsule 1 is not sufficiently utilized.

To overcome this problem, by means of the rotation device 3 it is possible to rotate the capsule 1 inside the brewing chamber 23 during the dispensing cycle, i.e., during the beverage brewing cycle.

The beverage dispensing cycle can therefore take place as follows. The capsule 1 is inserted into the brewing chamber 23, which for this purpose can be opened and closed with known mechanisms, not described in detail herein. Once the brewing chamber 23 has been closed, the brewing cycle can be started by starting the pump 13, which supplies pressurized water through the heating assembly 15, previously heated to the correct temperature. Pressurized hot water fills the volume defined by the cylinder 41 and by the piston 39 and pushes the latter into the position illustrated in FIG. 4, causing the perforator 35 to perforate the front wall 1.2 of the capsule 1.

When the pressure of the water in the volume defined by the cylinder 41 and by the piston 39 is sufficient to open the valve 43, water is supplied through the supply duct 33 into and through the capsule 1, so as to extract the ingredients and produce a beverage dispensed through the rear holes 1.5 of the capsule and collected by the dispensing duct 51. During dispensing the capsule 1 can be rotated, continuously or intermittently, by the rotation device 3 about the axis A-A of the capsule 1 and of the brewing chamber 23. In this way optimal utilization of all the ingredients I contained inside the capsule 1 is achieved.

The control unit 19 controls the operations described above so as to coordinate the rotation of the capsule 1 with the supply of water, optimizing utilization of the ingredients I. In the simplest embodiments, for example, the rotation of the capsule 1 could be a single rotation of 180° and could be carried out after an amount of water equal to approximately half the total amount required to produce a dose of beverage has been measured by means of the flow meter 17.

In other embodiments, rotation of the capsule 1 about its axis A-A controlled by the rotation device 3 can be continuous.

The capsule 1 can be rotated during the water supply and hence without interrupting the beverage dispensing cycle due to the fact that the perforator 35 is coaxial to the capsule 1 and therefore does not obstruct its rotation.

FIGS. 6 to 9 show a further embodiment of a beverage producing machine. The capsule 1 can be the same as the one described previously with reference to FIGS. 1 to 5 and therefore the characteristics of the capsule will not be described again. The brewing assembly 21 is also substantially similar to the assembly of FIGS. 1-5 and therefore will only be described briefly and in relation to the different parts.

Figure 6:
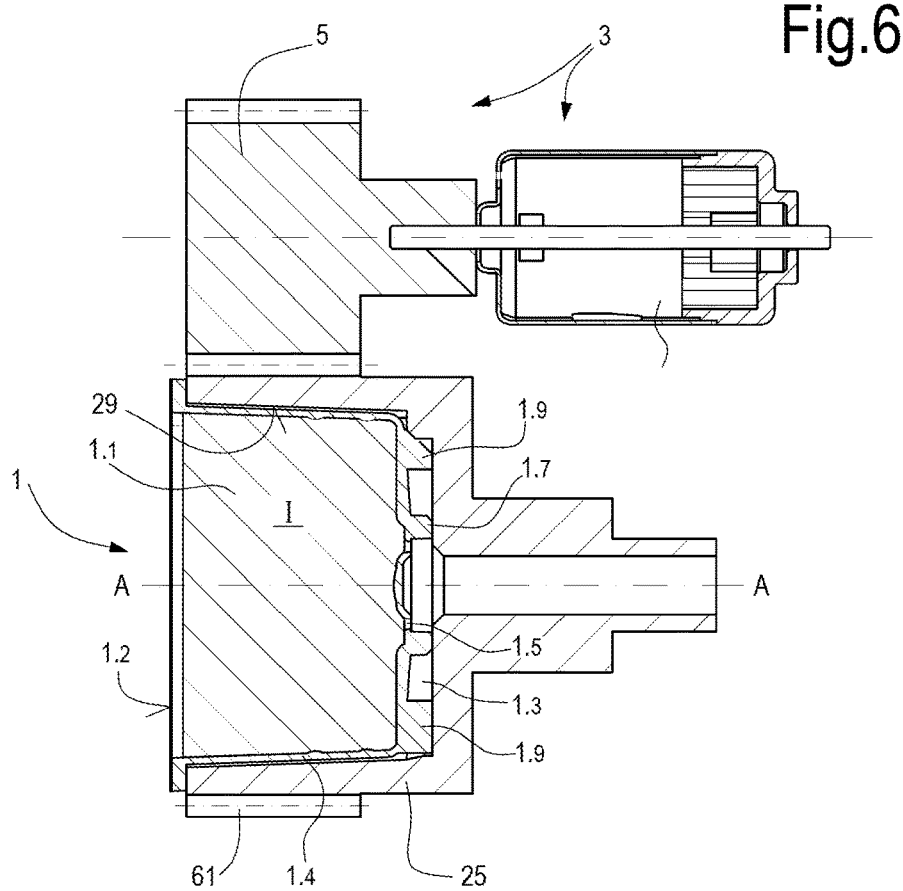
FIG. 6 illustrates a longitudinal section of a portion of brewing chamber and of a rotation device in a further embodiment.
Figure 7:
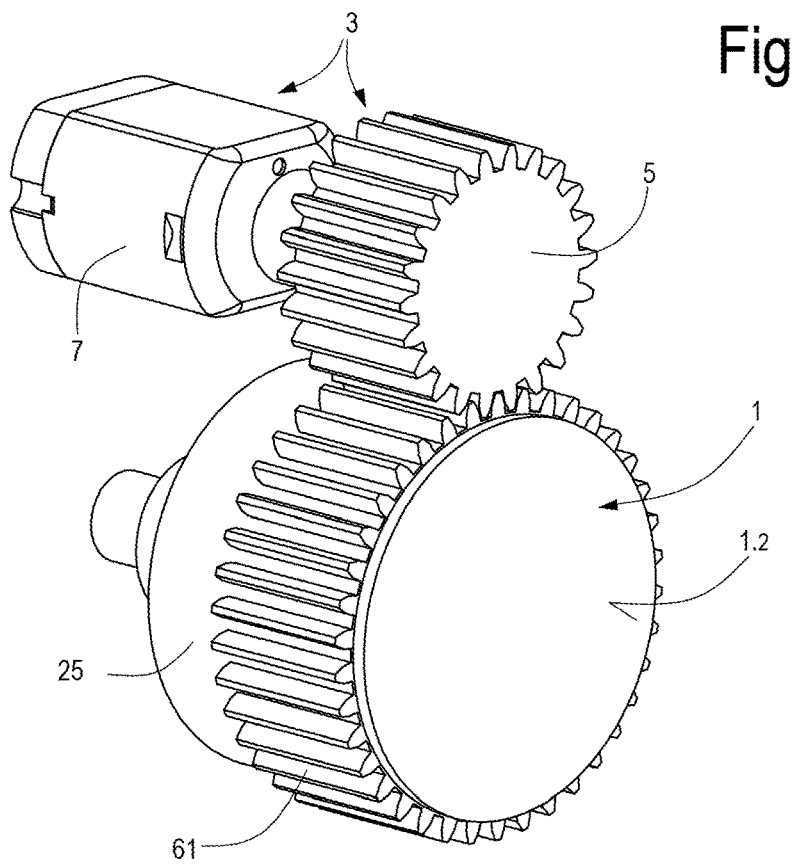
FIG. 7 illustrates an axonometric view of the assembly of FIG. 6.
Figure 8:
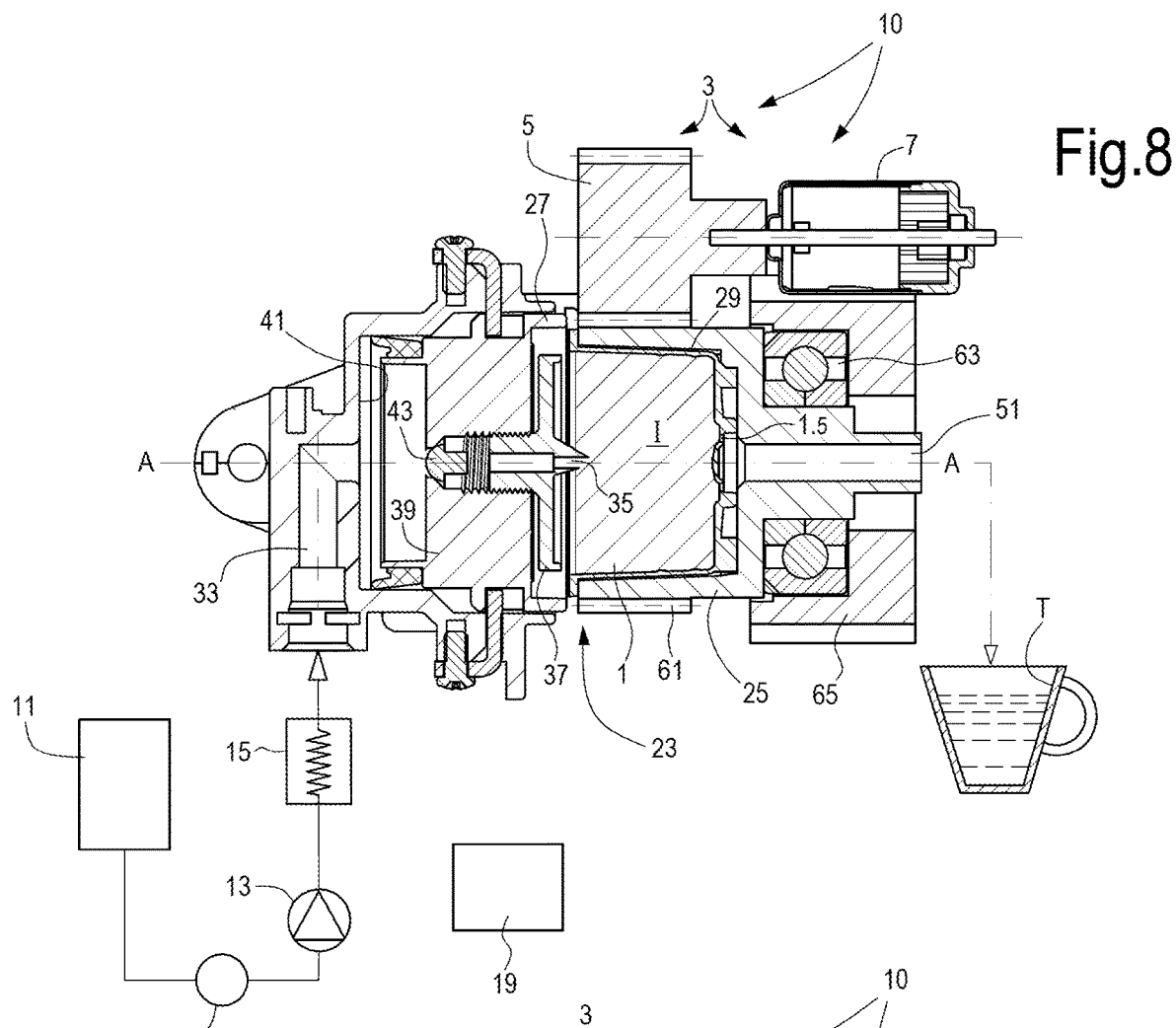
FIG. 8 illustrates a longitudinal section of the machine with the brewing chamber and the rotation device of FIGS. 6 and 7.

In the embodiment of FIGS. 6 to 9 the capsule is housed in a portion 25 of a brewing chamber 23 (FIG. 8). Unlike the embodiment of FIGS. 1 to 5, in the embodiment of FIGS. 6 to 9 the capsule 1 is not rotated inside the portion 25 of the brewing chamber 23, but it is the portion 25 of the brewing chamber 23 that is rotated with respect to the stationary part of the machine 10. Therefore, in this embodiment the capsule 1 can also differ from the capsule 1 illustrated in the preceding figures in the sense that the toothing 1.8 can be omitted and the component 1.9 can be an externally smooth collar.

FIGS. 6 and 7 show, similarly to FIGS. 1 and 2, only the capsule 1, a portion 25 of the brewing chamber, better shown in FIG. 8, and the rotation device 3. In this embodiment the portion 25 of the brewing chamber 23 has an outer toothing 61 that coacts with the toothing of the gear wheel 5 of the rotation device 3.

FIG. 8 shows the brewing chamber 23, which comprises the cup shaped portion 25 in which the capsule 1 is housed and which is closed by the moving portion 27, integral, as in the embodiment of FIG. 4, with the piston 39 so as to be able to move under the thrust of the pressurized water supplied by the pump 13.

As illustrated schematically in FIG. 8, in this embodiment the portion 25 of the brewing chamber 23 is supported so that it can rotate, for example by means of a bearing 63, in a load-bearing structure 65 of the machine 10. By means of the support 63, the portion 25 of the brewing chamber 23 can rotate, controlled by the rotation device 3, about the axis A-A of the brewing chamber and of the capsule 1 contained therein.

Also in this embodiment the perforator 35 is coaxial to the capsule 1 and therefore the brewing chamber 25 with the capsule 1 inside can rotate while brewing of the beverage, i.e. dispensing of pressurized and heated water through the capsule 1, is carried out.

In this case the beverage is dispensed through the dispensing duct 51 which by way of example is arranged coaxial to the seat 29 of the portion 25 of the brewing chamber, in which the capsule 1 is housed.

To prevent the capsule 1 from remaining stationary while the rotation device 3 rotates the portion 25 of the brewing chamber 23, once again the capsule can be provided with a form-fitting toothing 1.8 or profile, which provides a torsional coupling with a complementary profile provided in the bottom of the portion 25 of the brewing chamber 23. In this way, mechanical coupling between the capsule 1 and the portion 25 of the brewing chamber 23 is guaranteed, thus ensuring that the capsule 1 rotates together with the portion 25 of the brewing chamber under the control of the rotation device 3.

While in the previously described embodiments the perforator 35 is coaxial to the brewing chamber 23 and to the capsule 1 housed in the brewing chamber 23, it would also be possible for the perforator to be offset with respect to the brewing chamber and hence not located on the rotation axis, about which the capsule 1 rotates under the control of the rotation device 3. FIGS. 10 and 11 illustrate an embodiment in which the perforator, once again indicated with 35, is offset with respect to the axis A-A of the brewing chamber and of the capsule 1 contained therein. In FIGS. 10 and 11 the same numbers indicate the same or equivalent parts to those already described above, which will not be described again.

In FIGS. 10 and 11 the brewing chamber 23 is stationary and the capsule 1 rotates inside the portion 25 of the brewing chamber.

As the perforator 35 is offset with respect to the rotation axis A-A about which the capsule 1 rotates, to carry out the rotation of the capsule 1 without it being lacerated by the perforator 35, the brewing cycle can comprise a step in which the brewing chamber 23 is opened, distancing the perforator 35 from the front wall 1.2 of the capsule 1 housed in the portion 25 of the brewing chamber 23.

FIG. 10 illustrates the closed brewing chamber 23, while FIG. 11 shows the open brewing chamber with the perforator 35 distanced from the capsule 1. In the layout of FIG. 11, the rotation device 3 can be activated to cause rotation of the capsule 1 inside the portion 25 of the brewing chamber 23. Once the rotation, for example of 180°, has been carried out, the brewing chamber 23 can be closed again to carry out the final part of the brewing cycle.

The operation can be controlled automatically by the programmable control unit 19, which can, for example, detect, by means of the flow meter 17, the amount of water supplied through the supply duct 33 and interrupt the supply to carry out the rotation of the capsule 1 upon reaching approximately half of the total amount of water required to produce the beverage.

It would also be possible to carry out several consecutive rotations, for example of less than 180°, opening and closing the brewing chamber 23 several times. Nonetheless, this lengthens the brewing cycle and can cause heat loss. Therefore, the embodiment in which a single rotation of 180° of the capsule 1 is carried out is currently preferred.

Figure 9:
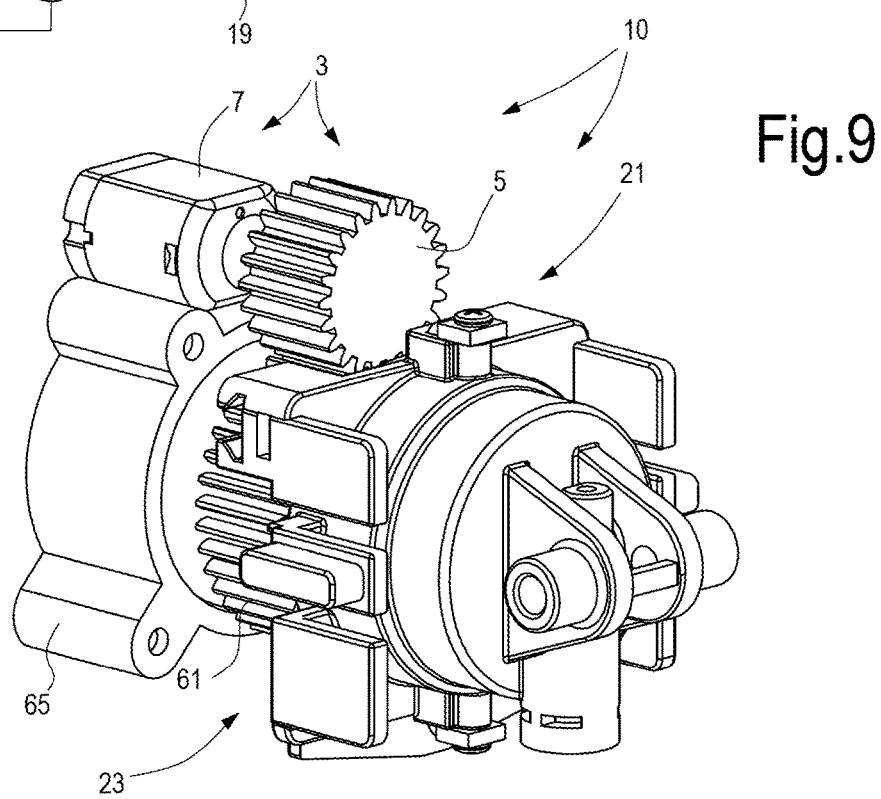
FIG. 9 illustrates an axonometric view of the brewing assembly of FIG. 8.
Figure 12:
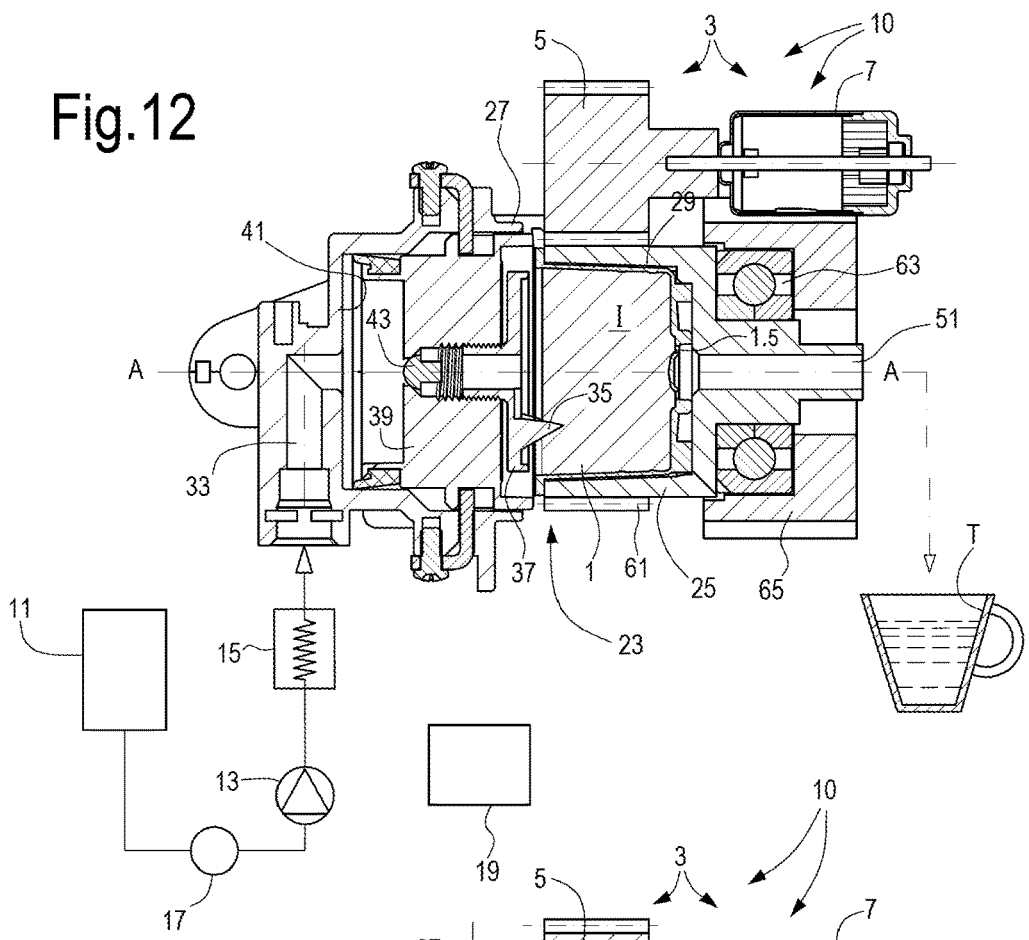
FIGS. 12 and 13 illustrate, analogously to FIGS. 10 and 11, steps of a brewing cycle with a further embodiment of the brewing assembly.
Figure 13:
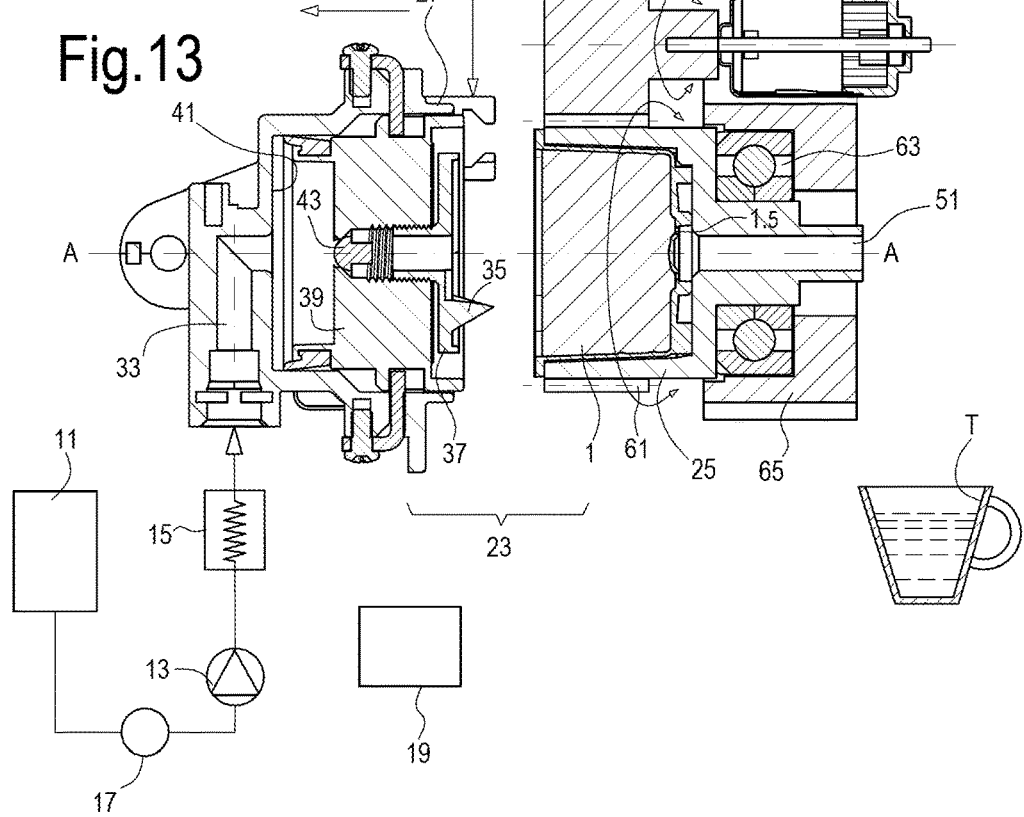

FIGS. 12 and 13 illustrate a modified embodiment, in which rotation of the capsule 1 is obtained, similarly to the embodiments illustrated in FIGS. 7 to 9, through rotation of the portion 25 of the brewing chamber. The same numbers in FIGS. 12 and 13 indicate the same or equivalent parts to those already described with reference to FIGS. 7 to 9, which shall not be described again.

The difference between the embodiment of FIGS. 12 and 13 and the embodiment of FIGS. 7 to 9 consists mainly in that the perforator 35 is offset with respect to the rotation axis A-A of the portion 25 of the brewing chamber 23. To allow rotation of the portion 25 of the brewing chamber 23, and of the capsule 1 contained therein, the brewing cycle comprises an opening step of the brewing chamber 23, as shown schematically in FIG. 13, to carry out rotation of the portion 25 of the brewing chamber 23 about the axis A-A with simultaneous rotation of the capsule 1 about the axis A-A.

As described with reference to FIGS. 10 and 11, also in this embodiment the brewing cycle can comprise several opening and closing steps of the brewing chamber 23 and consequently several rotation steps of the capsule 1 and of the portion 25 of the brewing chamber 23.

The invention claimed is:

1. A method for producing a beverage by means of a single serving capsule, wherein the single serving capsule contains one or more beverage ingredients, the method comprising the following steps:
    inserting the single serving capsule into a brewing chamber, wherein the single serving capsule has an axis of rotational symmetry and; wherein the single serving capsule has a front wall and a back wall distanced from one another along the axis of rotational symmetry; and wherein in the brewing chamber the axis of rotational symmetry is in a non-vertical position;
    closing the brewing chamber;
    pressurizing water with a pump to supply pressurized water to the single serving capsule;
    feeding a first amount of the supplied pressurized water into the single serving capsule and dispensing a first amount of beverage from the single serving capsule in a first angular position of the single serving capsule around said axis of rotational symmetry; wherein the water flows through said front wall of the single serving capsule and the beverage flows through said back wall of the single serving capsule;
    feeding a second amount of the supplied pressurized water into the single serving capsule and dispensing a second amount of beverage from the single serving capsule in a second angular position of the single serving capsule around said axis of rotational symmetry, wherein the water flows through said front wall of the single serving capsule and the beverage flows through said back wall of the single serving capsule.

2. The method of claim 1, further comprising the following step:
    supplying water to the brewing chamber and to the single serving capsule through a water supply duct across one of said front wall and back wall, and dispensing the beverage through the other of said front wall and back wall and from the brewing chamber through a beverage dispensing duct;
    wherein the single serving capsule is rotated from the first angular position to the second angular position while the single serving capsule is in the brewing chamber.

3. The method of claim 2, wherein the single serving capsule is rotated from the first angular position to the second angular position inside the brewing chamber, maintaining the brewing chamber in a fixed angular position.

4. The method of claim 2, wherein the single serving capsule is rotated from the first angular position to the second angular position integral with at least a portion of the brewing chamber in which the single serving capsule is housed.

5. The method of claim 1, wherein the single serving capsule is rotated from the first angular position to the second angular position while the water is fed thereinto and the beverage is dispensed therefrom.

6. The method of claim 1, wherein the single serving capsule is rotated from the first angular position to the second angular position while the supply of water thereinto is interrupted.

7. The method of claim 1, comprising the steps of:
    supplying water across one of said front wall and back wall through a water supply duct to the brewing chamber and through the single serving capsule, and dispensing the beverage through the other of said front wall and back wall and from the brewing chamber and through a beverage dispensing duct;
    during the step of supplying the water and dispensing the beverage, rotating the single serving capsule around the axis.

8. The method of claim 1, comprising the steps of:
    supplying water across one of said front wall and back wall through a water supply duct to the brewing chamber and through the single serving capsule, and dispensing the beverage through the other of said front wall and back wall and from the brewing chamber through a beverage dispensing duct;
    interrupting the supply of water to the single serving capsule;
    rotating the single serving capsule around the axis;
    resuming the supply of water and beverage dispensing.

9. The method of claim 8, further comprising the step of at least partially opening the brewing chamber to carry out rotation of the single serving capsule configured to allow free rotation of the capsule around the axis of rotational symmetry.

10. The method of claim 1, comprising the step of rotating the single serving capsule around the axis while the single serving capsule is maintained inside a brewing chamber, while maintaining the brewing chamber in a substantially fixed angular position.

11. The method of claim 1, comprising the step of simultaneously rotating the single serving capsule and at least a portion of the brewing chamber around the axis.

12. A method according to claim 1, further comprising providing a machine for producing beverages, wherein the machine for producing beverages comprises the brewing chamber, means for closing the brewing chamber with the single serving capsule inserted therein, a duct for supplying water to the brewing chamber; the pump is a controllable water feed pump for feeding pressurized water to the duct for supplying water to the brewing chamber; a duct for dispensing beverage from the brewing chamber; a rotation device, adapted to rotate the capsule with the capsule in the brewing chamber; and a control device operatively connected to the controllable water feed pump and operatively connected to the rotation device and controlling each of the steps of: dispensing of water through the single serving capsule with the single serving capsule in the first angular position around the capsule axis; rotating the single serving capsule from the first angular position around the capsule axis to a second angular position around the capsule axis with the single serving capsule in the brewing chamber; and dispensing water through the single serving capsule with the single serving capsule in the second angular position around the capsule axis.

13. A method for producing a beverage, the method comprising the steps of:
    providing a beverage producing machine that comprises a brewing chamber configured to receive a single serving capsule to provide an orientation of the single serving capsule with the capsule axis in the brewing chamber in a non-vertical position; a moveable closure for closing the brewing chamber with the single serving capsule inserted therein; a duct for supplying water to the brewing chamber; a controllable water feed pump configured to supply pressurized water to the duct for supplying water to the brewing chamber; a rotation device, adapted to rotate the capsule with the capsule in the brewing chamber; and a control device operatively connected to the controllable water feed pump and operatively connected to the rotation device;

providing a single serving capsule that defines a capsule space configured to contain one or more beverage ingredients, wherein the capsule space is delimited at least partially by a front wall and a back wall spaced a distance from one another along a capsule axis;

inserting the single serving capsule into the brewing chamber that provides the orientation of the single serving capsule with the capsule axis in the brewing chamber in a non-vertical position with the single serving capsule in a first angular position around the capsule axis relative to the brewing chamber;

closing the brewing chamber with the single serving capsule inserted therein;

pressurizing water with the controllable water feed pump to supply pressurized water to the single serving capsule;

feeding water, pressurized by the controllable water feed pump, into the single serving capsule with the single serving capsule in the first angular position around the capsule axis of rotational symmetry and dispensing a first amount of beverage from the single serving capsule in the first angular position around the capsule axis of rotational symmetry;

rotating the single serving capsule from the first angular position around the capsule axis to a second angular position around the capsule axis with the single serving capsule in the brewing chamber; and feeding water, pressurized by the controllable water feed pump, into the single serving capsule with the single serving capsule in the second angular position around the capsule axis of rotational symmetry and dispensing a second amount of beverage from the single serving capsule with the single serving capsule in the second angular position around the capsule axis of rotational symmetry.

* * * * *